United States Patent

[11] 3,607,554

| [72] | Inventor | William R. Heffernan |
| | | Westfield, N.J. |
| [21] | Appl. No. | 806,489 |
| [22] | Filed | Mar. 12, 1969 |
| [45] | Patented | Sept. 21, 1971 |
| [73] | Assignee | Bondit Corp. |
| | | Newark, N.J. |

[54] APPARATUS FOR JOINING SHEET MATERIAL ALONG A TWO-DIMENSIONAL CONTOUR
7 Claims, 3 Drawing Figs.

[52] U.S. Cl. ............................................ 156/380,
156/544, 156/583
[51] Int. Cl. ........................................... B29c 24/00,
B29c 27/04, B32b 31/04
[50] Field of Search............................................ 156/380,
583, 359, 295, 543, 544, 320, 309

[56] References Cited
UNITED STATES PATENTS
| 3,172,798 | 3/1965 | Rosenbaum.................. | 156/380 |
| 3,461,017 | 8/1969 | Fecher et al.................. | 156/380 |

Primary Examiner—Benjamin A. Borchelt
Assistant Examiner—J. J. Devitt
Attorney—Ryder, McAulay & Hefter ABSTRACT: Apparatus for joining layers of sheet material along a two-dimensional contour by means of dry thermally active adhesive therebetween comprises belt means for moving the materials lengthwise in a predetermined first direction, radiofrequency means for heating the adhesive to cause it to liquefy or plasticize, first means for applying a releasable compressive pressure to the materials and the adhesive in the area to be joined, and pivot pin means for applying constant compressive pressure to an isolated point of the materials, thereby, upon the momentary release of the pressure applied by the first means, to allow the materials to be pivoted about the isolated point and to be joined along the contour.

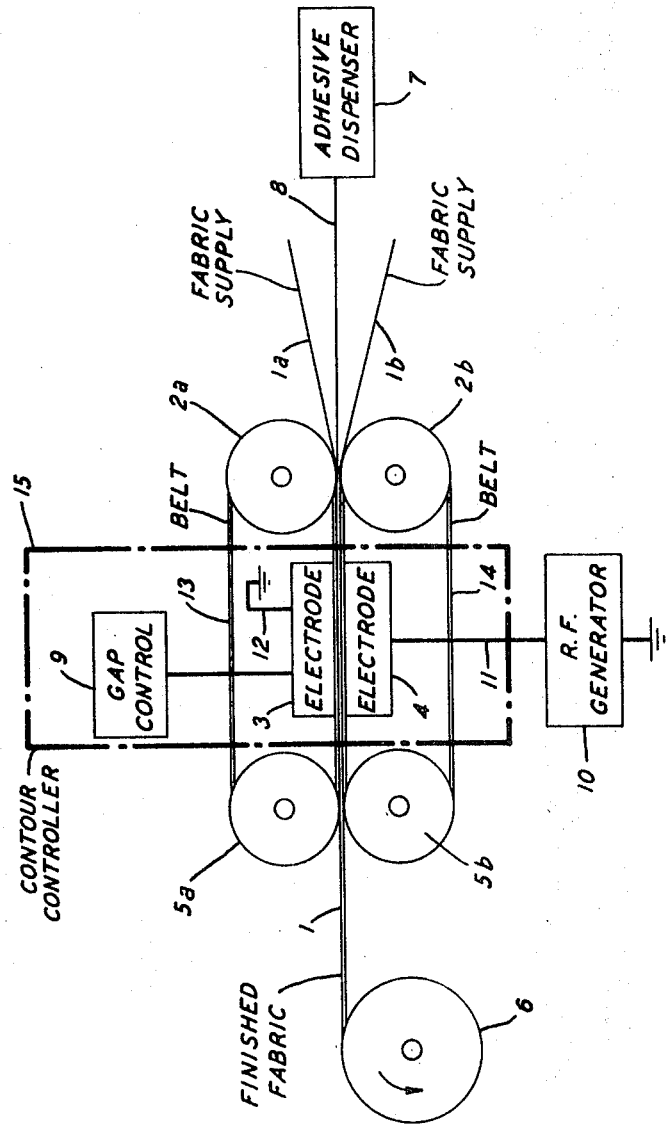

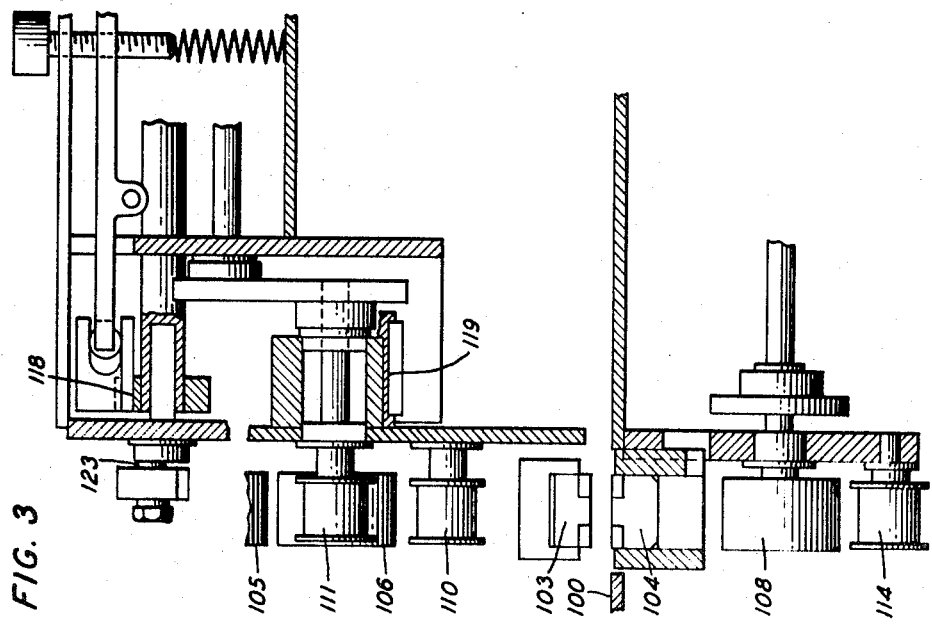
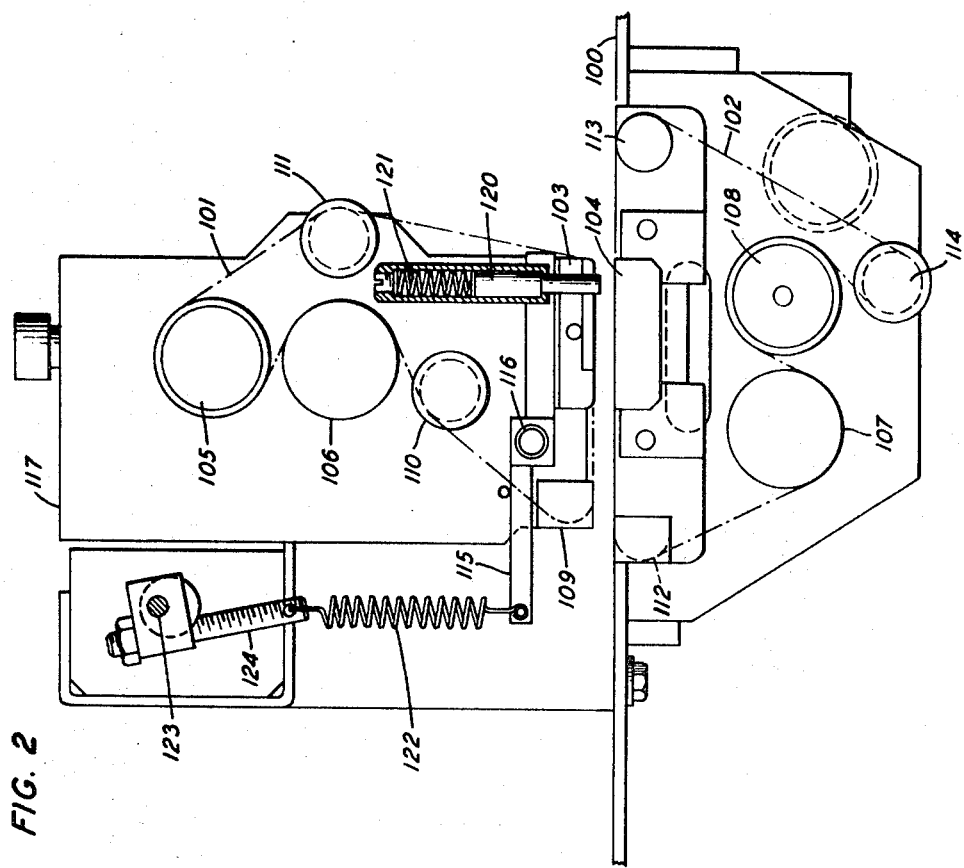

APPARATUS FOR JOINING SHEET MATERIAL ALONG A TWO-DIMENSIONAL CONTOUR

BACKGROUND OF THE INVENTION

This invention relates to apparatus for joining together layers of sheet material, and more particularly, to joining of sheet materials along a two-dimensional contour with a thermoactive adhesive.

A variety of procedures are taught by the prior art for applying adhesive to the edges of material to be joined and by then activating or drying the adhesive to form a permanent seal. One recently developed procedure of particular interest is disclosed in U.S. Pat. application Ser. No. 653,787 of M. Goldstein et al. filed on July 17, 1967 and assigned to applicants' assignee. In accordance with that application, sheets of material to be joined are unwound from separate supply rolls and fed into a superposed or overlapping relationship wherein the edge of one sheet overlaps a corresponding portion of the sheet to which it is to be joined. As the two sheets are so positioned, a thread of dry monofilament thermally active adhesive is fed from a supply chamber and interfed between the two sheets, parallel to and intermediate the edges to be joined. The adhesive and the edges are then fed to apparatus which concurrently compresses together the edges and subjects them to the field developed by radiofrequency heating apparatus. This melts the adhesive and causes it to flow over the width of the overlapped edges. The advance of the sheet material is continued, the material with the melted adhesive advances beyond the influence of the radiofrequency field, the adhesive solidifies and forms a strong unitary joint in the area defined by the overlapped edges.

A feature of the technique is the provision of equipment for joining overlapped or superposed sheet edges by inserting dry thermally active adhesive therebetween and by then concurrently heating the adhesive with a radiofrequency field while maintaining a compressive force on the edges and the adhesive during the time they are subjected to the radiofrequency field.

The aforementioned equipment, although readily capable of joining straight edges of layers of sheet material, is not adapted to joining material along a two-dimensional contour in the plane of the sheet material. The necessity for such a contour-joining operation frequently arises, as for example in joining the curved seams of wearing apparel.

It is, therefore, a broad object of the present invention to provide apparatus for moving sheet material along a predetermined two dimensional contour in the plane of the material.

It is a more specific object of the invention to provide apparatus for joining the edge portions of layers of sheet material along a two dimensional contour in the plane of the material by means of an adhesive disposed therebetween.

SUMMARY OF THE INVENTION

In accordance with an illustrative embodiment of the invention, apparatus for joining layers of sheet material along a two-dimensional contour in the plane of the material by means of a dry thermally active adhesive therebetween comprises belt means for moving the materials lengthwise in a predetermined first direction, radiofrequency means for heating the adhesive to cause it to plasticize or liquefy, first means for applying a releasable compressive pressure to the materials and the adhesive in the area to be joined, and pivot pin means for applying constant compressive pressure to isolated point of the materials, thereby, upon the momentary release of the pressure applied by the first means, to allow the material to be pivoted about the isolated point and to be joined along the contour.

BRIEF DESCRIPTION OF THE DRAWINGS

These and other objects of the invention, together with its various features and advantages, can be easily understood from the following more detailed description taken in conjunction with the accompanying drawings, in which FIG. 1 is a schematic view of apparatus embodying the invention;

FIG. 2 is a cross-sectional front view of an illustrative embodiment of the invention; and FIG. 3 is cross-sectional partial side view of the embodiment shown in FIG. 2.

DETAILED DESCRIPTION

Before discussing in detail the specific embodiment of the present invention, it will be helpful to consider first, with reference to the schematic of FIG. 1, general apparatus for edge joining layers of sheet material along straight lines. In FIG. 1 separate sheets of material 1a and 1b are withdrawn from individual supply rolls (not shown), advanced to the left between rolls 2a and 2b, between electrodes 3 and 4, between rolls 5a and 5b, and then rewound as joined sheets 1 on finish roll 6. An adhesive dispenser 7 supplies a dry monofilament thermally active adhesive 8 which is positioned intermediate the edge portions of sheets 1a and 1b that are to be joined. By means of a piece of tape, for example the leading end of adhesive 8 is affixed to the edge portion of either sheet 1a or 1b so that the adhesive remains between the edges to be joined and is interfed therebetween as the sheets advance to the left with reference to FIG. 1. The rolls 2a and 2b, by means of their spaced-apart distance, initially compress the filament of adhesive 8 between the edges of sheets 1a and 1b. The sheet edges and the adhesive then pass, with the assistance of belts 13 and 14, between electrodes 3 and 4 which further compresses them with a force determined by gap control 9. The combination of gap control and electrodes is generally designated at 15, and as will be described hereinafter is the subject matter of the present invention. Belt 13 passes between the electrodes and around the outer surfaces of rollers 2a and 5a. Belt 14 passes under belt 13, between the electrodes, and around rollers 2b and 5b. Advantageously, the belts may be of any suitable material and coated with a substance such as Teflon.

Electrode 4 is connected by conductor 11 to the ungrounded output of radio frequency generator 10. Electrode 3 is grounded via conductor 12. The resulting radiofrequency field between the electrode melts the filament of adhesive and the compressive force applied by the electrode causes the melted adhesive to flow and cover the edges to be joined. The melted film of adhesive then solidifies and forms a permanent bond when the sheets 1a and 1b continue their leftward travel and pass beyond electrodes 3 and 4. The edge-joined sheets 1 then pass between cylinders 5a and 5b and are rerolled on finish roll 6.

The sheets 1a and 1b may be positioned by their supply rolls in a side-by-side overlapping edge relationship and then joined in the manner described if it is desired to have the width of the joined sheets 1 as taken upon finish roll 6 be equal to the sum of the width of individual sheets 1a and 1b.

Alternatively, the sheets 1a and 1b may be positioned one on top of the other, joined on their edge that passes between the electrodes, passed between rolls 5a and 5b, and rerolled on finish roll 6 so that the width of the finish sheet 1 is not greater than that of either of sheets 1a or 1b. In this case, the finish sheet 1 may subsequently be unfolded to form a wider sheet when removed from roll 6.

FIG. 1 discloses the adhesive dispenser 7 as being a considerable distance from rollers 2a and 2b. In practice, the dispenser 7 may be as close as may be desired to rollers 2a and 2b.

Sealing apparatus in accordance with the invention for enabling the general apparatus described above to perform the function of joining sheet materials along a two-dimensional contour in the plane of the material is shown in FIGS. 2 and 3. The sealing apparatus comprises a platform 100 upon which are guided the layers of sheet material to be joined and the interfed adhesive (not shown). The material together with the adhesive is conveyed between electrodes 103 and 104 in a predetermined first direction along the platform by means of conveyor belts 101 and 102. The belts 101 and 102, which are parallel in the region between the electrodes, are driven by drive rollers 105, 106, 107 and 108, and are guided by guides 109, 110, 111, 112, 113, and 114.

The lower electrode 104 is typically insulated from, and fastened in fixed relationship to, the frame of the apparatus. It is also electrically connected to the high-voltage output of RF generator 10 (FIG. 1). The upper electrode 103 on the other hand, is electrically grounded and is mechanically mounted on lever 115 which rotates about pivot 116. Pivot 116, together with upper belt drive rollers 105 and 106 and guides 109, 110, and 111 are mounted on plate 117 which is fixed to the frame of the sealing apparatus by flexplates 118 and 119 (FIG. 3) so that its movement is restricted to vertical motion.

Joining of sheet materials is accomplished with plate 117 in its down position abutting a fixed stop on the frame of the apparatus. With plate 117 down, constant compressive pressure is maintained at an isolated point between the belts 101 and 102 and the material to be joined by pivot pin 120, one end of which contacts the material and the other end of which urges against spring 121. Releasable compressive pressure is maintained on upper electrode 103 by varying the tension on spring 122 by means of a rotating eccentric 123 which is maintained in fixed relationship to the frame of the apparatus. The eccentric 123 is coupled to one end of spring 122 by means of connecting rod 124. The other end of spring 122 is connected to one end of lever 115.

In operation, connecting rod 124 is adjusted so that the pressure on electrode 103 is momentarily relieved to allow the material passing between the belts and the electrodes to be moved laterally with respect to the path of the belts. Because pivot pin 120 maintains constant pressure between the belts at a single point, the material to be joined is fed continuously in the direction of the path of the belts, but can be pivoted about this point as the pressure is relieved from the upper electrode. In this manner, the materials can be joined along any two-dimensional contour since both longitudinal and lateral motion is provided for.

The following parameters are illustrative only and are not to be construed as limitations upon the scope of the invention. Typically, the pressure on pin 121 is about 12 pounds, whereas the pressure on electrode 103 ranges from zero to 40 pounds. The no-pressure duty cycle of the eccentric is about 20 percent for an eccentric speed of 500 in/min.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. Apparatus for joining sheet material along a contour comprising:

conveying means for continuously conveying first and second portions of said material along a path to provide face-to-face contact between said portions of material along a portion of said path and for continuously interfeeding a dry adhesive thread between said portions of material along said portion of said path, heating means for heating said adhesive thread along said portion of said path, releasable pressure means adjacent said portion of said path to apply intermittent compressive pressure along said portion of said path between said first and second portions of said material, the magnitude of the heat and pressure applied by said heating means and said pressure means being great enough to cause said heated adhesive to flow sufficiently to join together said fabric portions in a line, and a pivot pin adjacent said portion of said path, said pivot pin providing continuous compressive pressure between said portions of said material at a single point along said portion of said path, whereby the momentary release of the pressure applied by said releasable pressure means will permit said materials to be pivoted about said point at which said pivot pin applies pressure so that said materials can be moved and joined along a contour.

2. The apparatus of claim 1 wherein:

said pivot pin is positioned at the front of said portion of said path.

3. The apparatus of claim 1 wherein:

said conveying means includes first and second belts, each having a portion thereof parallel to and in spaced relation to each other along each portion of said path, said belts being between said releasable pressure means and the material being conveyed on said belts, one of said belts being between said pivot pin and the material being conveyed by said belts.

4. The apparatus of claim 2 wherein:

said conveying means includes first and second belts, each having a portion thereof parallel to and in spaced relation to each other along said portion of said path, said belts being between said releasable pressure means and the material being conveyed on said belts, one of said belts being between said pivot pin and the material being conveyed by said belts.

5. The apparatus of claim 1 mounted within a fixed frame and wherein:

said conveying means comprises an upper belt and a lower belt each having a portion thereof parallel to, and in spaced relation to, each other in the material area to be joined, a sideplate, said plate having an upper and lower position, drive roller means for causing said belts to propagate so as to convey said materials along said path, said belts being in contact with said material in said portion of said path and said rollers being mounted on said sideplate, said releasable pressure means, with said sideplate in its lower position, comprises a lower member having a substantially flat upper horizontal surface, an upper member having a substantially flat lower horizontal surface parallel to and spaced apart from said lower member, said upper member urging said upper belt against the top surface of said materials and said lower member urging said lower belt against the bottom surface of said materials, a lever mounted on said upper member, a pivot in said sideplate about which said lever rotates, means connected to said lever at a point thereon separated from said member by said pivot for periodically applying and releasing pressure to said lever and hence to said upper member and to said materials, and said pivot pin for applying continuous compressive pressure at a single point along said path comprises a spring, a substantially vertical pivot pin one end of which is in contact at said single point along said path and the other end of which urges against said spring.

6. The apparatus of claim 5 wherein said means for periodically applying and releasing pressure to said lever comprises a rotating eccentric maintained in fixed relationship to the frame of said apparatus, a connecting rod coupled to said eccentric, a spring having one end connected to said rod and the other end connected to said lever.

7. The apparatus of claim 6 wherein said upper and lower members include respectively an upper and a lower electrode, the upper electrode being electrically grounded and the lower electrode being electrically connected to the output of a radiofrequency energy source.